United States Patent [19]

Burns et al.

[11] Patent Number: 5,595,593
[45] Date of Patent: Jan. 21, 1997

[54] TREATMENT OF FILLERS WITH OXA-SILACYCLOALKANES

[75] Inventors: Gary T. Burns; Linda D. Kennan; Aroop K. Roy; Arthur J. Tselepis, all of Midland, Mich.

[73] Assignee: Dow Corning Corporation, Midland, Mich.

[21] Appl. No.: 542,153

[22] Filed: Oct. 12, 1995

[51] Int. Cl.$^6$ .................................................. C08K 5/04
[52] U.S. Cl. ........................................ 106/499; 106/506
[58] Field of Search ................................... 106/499, 506

[56] References Cited

U.S. PATENT DOCUMENTS

| | | | |
|---|---|---|---|
| 5,290,901 | 3/1994 | Burns | 528/34 |
| 5,320,673 | 6/1994 | Carpenter | 106/499 |
| 5,482,547 | 1/1996 | Bugnon et al. | 106/499 |
| 5,498,781 | 3/1996 | Hall et al. | 106/499 |

*Primary Examiner*—Helene Klemanski
*Attorney, Agent, or Firm*—James L. DeCesare

[57] ABSTRACT

A method of hydrophobing fillers such as inorganic pigments, metal oxides, metal hydroxides, and silicate minerals, involves contacting a filler with an oxa-silacycloalkane, until hydroxyl functionality on the filler is replaced with carbinol functionality (i.e. ≡C—OH). The preferred oxa-silacycloalkane is 2,2,4-trimethyl-1-oxa-2-silacyclopentane.

12 Claims, No Drawings

TREATMENT OF FILLERS WITH OXA-SILACYCLOALKANES

BACKGROUND OF THE INVENTION

This invention is directed to a new treating agent for fillers which yields a substantially different surface treatment. In particular, various types of fillers with surfaces containing a reactive group such as $\equiv$SiOH, AlOH, or TiOH, for example, ring open oxa-silacycloalkanes to form carbinol treated surfaces.

Dow Corning's U.S. Pat. No. 5,290,901 (Mar. 1, 1994) describes the formation of certain carbinol functional silicones by reacting a cyclic silyl ether with (i) a silanol (i.e. $\equiv$SiOH) endcapped silicone fluid, or (ii) a silicone resin. While we form carbinol functional materials with similar ethers (i.e. an oxa-silacycloalkane), we use inorganic pigments, metal oxides, metal hydroxides, or silicate minerals.

Inorganic pigments, metal oxides such as silica ($SiO_2$), metal hydroxides, and silicate minerals, are not the same as or similar to silanol endcapped silicone fluids or silicone resins in the '901 patent. Although silica and silicate minerals are compounds of silicon, unlike silanol endcapped silicone fluids and silicone resins of the '901 patent, silica and silicate minerals do not contain $\equiv$Si—C bonds.

Thus, silicone fluids and silicone resins belong to the class of organosilicon compounds. Their characteristic feature is that they have at least one direct $\equiv$Si—C bond in the molecule. Silica and silicate minerals, on the other hand, are not classified as organosilicon compounds, since they contain no carbon atom. Where a carbon atom does exist, (i.e. organic silicates), it is attached to silicon only through oxygen. Hence, materials treated in Dow Corning's '901 patent and in our invention have little in common.

BRIEF SUMMARY OF THE INVENTION

It is the object of our invention to provide a method of hydrophobing a filler by contacting a filler such as an inorganic pigment, metal oxide, metal hydroxide, or silicate mineral, with an oxa-silacycloalkane, until hydroxyl functionality on the filler is replaced with carbinol functionality.

These and other features and objects of our invention will become apparent from a consideration of the detailed description.

DETAILED DESCRIPTION

Filler surfaces can be reacted with oxa-silacycloalkanes such as 2,2,4-trimethyl-1-oxa-2-silacyclopentane to form carbinol functional fillers. For example, the following reaction takes place on the surface of silica:

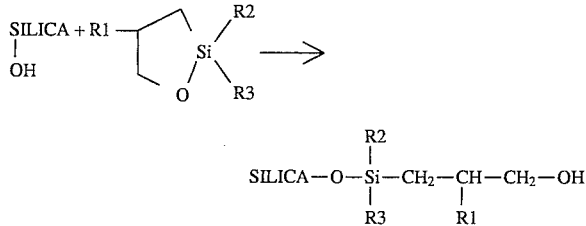

As used herein, the term "filler" is intended to include any of the common finely divided solids added to a system to improve its properties or reduce its cost. It includes for example, materials used in plastics to increase stiffness, affect electrical properties, or improve chemical resistance. It also includes materials used in rubber to improve rigidity, or tear strength. It further includes materials used in liquid systems such as caulks, sealants, and adhesives; to control thixotropy, sag, or shrinkage.

Some benefits of our invention are that the carbinol functionality on filler surfaces can improve adhesion of filler particles to polymer matrices which increases many of the above properties. In addition, carbinol functionality can undergo typical organic reactions with functional polymers.

One example representative of these reactions is the reaction of the carbinol treated silica with a perfluorocarboxylic acid $F—(CF_2)_n—COOH$ to add a perfluoro group to the silica surface. This reaction is shown schematically as follows:

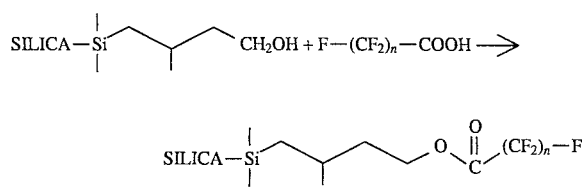

Such reactions can be conducted with perfluorocarboxylic acids of the formula $F—(CF_2)_n—COOH$ where n is 1–13, for example. Exemplary of such acids are perfluoroacetic acid $CF_3—COOH$, perfluoropropionic acid $CF_3—(CF_2)—COOH$, perfluorobutyric acid $CF_3—(CF_2)_2—COOH$, perfluorohexanoic acid $CF_3—(CF_2)_4—COOH$, perfluoroheptanoic acid $CF_3—(CF_2)_5—COOH$, perfluorooctanoic acid $CF_3—(CF_2)_6—COOH$, perfluorononanoic acid $CF_3—(CF_2)_7—COOH$, perfluorodecanoic acid $CF_3—(CF_2)_8—COOH$, and perfluoroundecanoic acid $CF3—(CF_2)_9—COOH$.

The fillers can be minerals, metallic powders, or synthetic inorganic compounds. The only requirement is that the filler present surfaces with reactive hydroxyl containing groups. For example, surfaces of silica and various silicates are known to be well endowed with silanol groups $\equiv$SiOH.

Some suitable fillers useful in the practice of our invention are particulate inorganic pigments, metal oxides, metal hydroxides, or porous substances. Representative inorganic pigments are titanium dioxide, iron oxide, and titanium coated mica. Representative metal oxides are silica, magnesium oxide, calcium oxide, aluminum oxide, titanium oxide, zirconium oxide, chromium oxide, manganese oxide, cobalt oxide, and nickel oxide. Representative metal hydroxides are magnesium hydroxide, calcium hydroxide, aluminum hydroxide, chromium hydroxide, and iron hydroxide. Representative porous substances are silicate minerals such as kaolin, montmorillonite, clay mica, chlorite, serpentine, zeolites, pyrophyllite, talc, chrysotile, antigorite, lizardite, kaolinite, nacrite, halloysite, nontronite, saponite, sauconite, bentonite, natrolite, heulandite, stilbite, mesolite, scolecite, thomsonite, analcite, phillipsite, chabazite, muscovite, biotite, sericite, lepidolite, wollastonite, nepheline-syenite, dickite, epistilbite, harmotome, gmelinite, lepidomelane, zinnwaldite, and paragonite.

Composites such as silica-alumina and mica-iron oxide; and readily available materials such as sand, ground glass, plate glass, and glass beads, can also be employed. The silica can be fumed, ground, precipitated, colloidal, diatomaceous, solid, hollow, crystalline, amorphous, anhydrous, hydrated, aerogel, xerogel, fused, or pyrogenic.

The oxa-silacycloalkane can be an oxa-silacyclopentane, an oxa-silacyclohexane, or an oxa-silacycloheptane. The silicon atom in the ring can be substituted with alkyl groups of 1–6 carbon atoms such as methyl, ethyl, propyl, butyl, pentyl, and hexyl; an aryl group such as phenyl; aralkyl groups such as benzyl, phenethyl, or 2-phenylpropyl; alkaryl groups such as tolyl or xylyl; or a corresponding halohydrocarbon radical such as 3-chloropropyl. Carbon atoms in the ring can be similarly substituted, with the addition of hydrogen as an alternative.

Representative oxa-silacycloalkanes appropriate for use according to our invention are compounds such as
2,2,4-trimethyl-1-oxa-2-silacyclopentane,
2,2,-dimethyl-1-oxa-2-silacyclopentane,
2,2,-diphenyl-1-oxa-2-silacyclopentane,
2,2,-dimethyl-3-phenyl-1-oxa-2-silacyclopentane, and
2,2,-dimethyl-1-oxa-2-silacyclohexane.

Each of these compounds, respectively, is shown below:

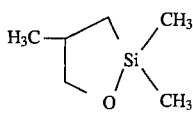

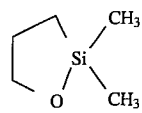

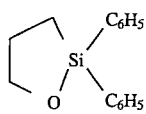

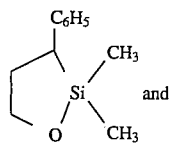

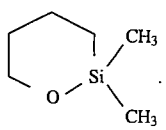

The most preferred oxa-silacycloalkane is 2,2,4-trimethyl-1-oxa-2-silacyclopentane:

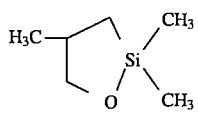

The process for contacting and hydrophobing fillers with oxa-silacycloalkanes until hydroxyl functionality on the filler is replaced with carbinol functionality, can be conducted in any desired manner. Typically, a solvent solution of the oxa-silacyciolkane is added to the filler, and the mixture is slurried although the process can be conducted using neat oxa-silacyciolkane. Application of heat aids the processing but not required, and the contact can be made at any temperature between 25°–150° C. where a solvent is employed, it is separated, and the product allowed to air dry, or it can be dried in an oven. Conventional solvents are employed, such as pentane, hexane, heptane, octane, decane, benzene, toluene, xylene, diethyl ether, or dibutyl ether.

The reaction of the oxa-silacycloalkane with reactive filler hydroxyls is stoichiometric. Therefore, the extent of treatment can be controlled by the molar ratio of the oxa-silacycloalkane to reactive filler hydroxyl. In practice, per-silylation a slight excess of the oxa-silacycloalkane to react with the filler hydroxyls and any adsorbed moisture on the filler.

Our invention is shown in more detail in the examples.

EXAMPLE I

Fumed Silica Treatment

This example illustrates a solution treatment method. A sample (9.6 grams) of Cab-O-Sil® LM7, a fumed silica with a surface area of 150 m²/g (BET Method, i.e. Brunauer-Emmett-Teller), and a product of Cabot Corporation, Tuscola, Ill., was placed in a flask and devolatilized to remove any water which might be hydrogen bound to the silica surface. Toluene (300 mL) was then added and the silica was dispersed. The compound 2,2,4-trimethyl-1-oxa-2-silacyclopentane was added (8.0 grams) to the slurry, and the mixture was heated at 110° C. for three hours to drive the reaction. The toluene and excess of the silacyclopentane was removed by vacuum. The silica was then dried in a vacuum oven. Analysis of the silica via Diffuse Reflectance Infrared (IR) Spectroscopy showed reaction of the free silanols (i.e. ≡SiOH) on the silica surface and the formation of carbinols (i.e. ≡C—OH). In addition, the treated silica floated in distilled water, while the non-treated silica dispersed in distilled water, indicating that the treated silica had been hydrophobed.

EXAMPLE II

This example represents a neat treatment where the silica and the oxa-silacycloalkane were mixed together without need of a solvent. 90.7 grams of Cab-O-Sil® M7D, a fumed silica with a BET surface area of 200 m²/g, another product of Cabot Corporation, was treated neat by adding 16.9 grams of 2,2,4-trimethyl-1-oxa-2-silacyclopentane to the M7D silica in a Waring Blender, under $N_2$ purge. The materials were mixed for 10 minutes and removed from the blender. Analysis by Diffuse Reflectance IR Spectroscopy showed complete reaction of the free silanols on the silica surface and the formation of carbinols, as shown in Table I.

TABLE I

| | SiOH | | |
| --- | --- | --- | --- |
| Material | Free (3745 cm⁻¹) | H-Bonded (3500 cm⁻¹) | C—OH 3345 cm⁻¹ |
| Control M7D Silica | very strong | strong | none |
| M7D Silica + Treating Agent | none | weak | strong |
| M7D Silica + Treating Agent + Heat | none | weak | very strong |

EXAMPLE III

A second sample of the M7D silica was treated in the same manner and in the same amounts as in Example II. The material was then placed in a 110° C. oven for 2 hours to drive off residual water and further the reaction. Diffuse Reflectance IR Spectroscopy indicated complete reaction of the free silanols on the surface of the silica, as shown in Table II. While heat is not necessary to drive the reaction of 2,2,4-trimethyl-1-oxa-2-silacyclopentane with free silanols on the silica, it increased the treatment level.

TABLE II

| Material | SiOH | | |
|---|---|---|---|
| | Free (3745 cm$^{-1}$) | H-Bonded (3500 cm$^{-1}$) | C—OH 3345 cm$^{-1}$ |
| Control M7D Silica | very strong | strong | none |
| M7D Silica + Treating Agent + Heat | none | weak | very strong |

EXAMPLE IV

Examples II and III were repeated using 90.02 grams of a fumed titania (P-25) available from Degussa Corporation, Dublin, Ohio, and 15.6 grams of 2,2,4-trimethyl-1-oxa-2-silacyclopentane. Treatment was evident due to disappearance of peaks at 3632 cm$^{-1}$ and 3662 cm$^{-1}$, the appearance of a peak at 3345 cm$^{-1}$ for C—OH, and the appearance of a peak at 1260 cm$^{-1}$ for Si—CH$_3$. This is shown in Table III.

TABLE III

| Material | TiOH 3632 cm$^{-1}$ | TiOH 3662 cm$^{-1}$ | C—OH 3345 cm$^{-1}$ | Si—CH3 1260 cm$^{-1}$ |
|---|---|---|---|---|
| Control TiO$_2$ | medium | medium | none | none |
| TiO$_2$ + Treating Agent | none | none | strong | strong |
| TiO$_2$ + Treating Agent + Heat | none | none | very strong | strong |

EXAMPLE V

Fumed alumina (Alumina Oxide C) available from Degussa Corporation, Dublin, Ohio, was treated in a manner similar to Examples II and III. Diffuse Reflectance IR Spectroscopy of the treated alumina showed strong absorbance at 1258 cm$^{-1}$ attributable to Si—CH$_3$, and 2870–2960 cm$^{-1}$ attributable to C—H. The treated samples were subsequently washed three times with toluene and dried for six days under vacuum. Diffuse Reflectance IR Spectroscopy showed strong absorbances at 1258 cm$^{-1}$ and 2870–2960 cm$^{-1}$ indicating that surface treatment was retained. This is shown in Table IV.

TABLE IV

| Material | Si—CH3 1258 cm$^{-1}$ | C—H 2870–2960 cm$^{-1}$ |
|---|---|---|
| Control Al$_2$O$_3$ | none | none |
| Al$_2$O$_3$ = Treating Agent | strong | strong |
| Al$_2$O$_3$ + Treating Agent + Heat | strong | strong |
| Al$_2$O$_3$ + Treating | strong | strong |

TABLE IV-continued

| Material | Si—CH3 1258 cm$^{-1}$ | C—H 2870–2960 cm$^{-1}$ |
|---|---|---|
| Agent Extracted Al$_2$O$_3$ + Agent + Heat Extracted | strong | strong |

The following example illustrates reaction of a carbinol treated silica with a perfluorocarboxylic acid F—(CF$_2$)$_n$—COOH to add a perfluoro group to the silica surface.

EXAMPLE VI

A 3-neck 100 mL flask was washed with a 1% solution of dodecylbenzenesulfonic acid surfactant, rinsed with deionized water, and dried at 100° C. overnight. The flask was equipped with a TEFLON® coated magnetic stir bar, a thermometer, a condenser, and a Dean-Stark trap. To the flask was added 50 grams of toluene, one gram of carbinol functional silica from Example I, and one gram of perfluorooctanoic acid CF$_3$—(CF$_2$)$_6$—COOH. This mixture was heated with an oil bath on a magnetic stirring hot plate to reflux. The mixture was refluxed for five hours. During the five hour period, the Dean-Stark trap accumulated approximately 0.1 mL of water. The water was removed along with 40 grams of toluene and excess perfluorooctanoic acid. The remaining solution was poured into a glass petri dish and dried under vacuum to yield 1.1 grams of fluorinated silica. The evidence of esterification of the carbinol functional silica from Example I was documented by Diffuse Reflectance IR Spectroscopy. The broad band due to the O—H stretch of the acid group was absent in the IR spectrum of the fluorinated silica. Disappearance of O—H absorption was accompanied by appearance of a sharp band at approximately 1765 cm$^{-1}$. This band was due to the C═O stretch of the ester.

Other variations may be made in compounds, compositions, and methods described without departing from the essential features of our invention. The forms of invention are exemplary and not limitations on its scope as defined in the claims.

We claim:

1. A method of hydrophobing a filler comprising contacting a filler selected from the group consisting of inorganic pigments, metal oxides, metal hydroxides, and silicate minerals, with an oxa-silacycloalkane, in an amount sufficient for at least a portion of hydroxyl functionality on the filler to be replaced with carbinol functionality.

2. A method according to claim 1 in which the oxa-silacycloalkane is a compound selected from the group consisting of 2,2,4-trimethyl-1-oxa-2-silacyclopentane, 2,2,-dimethyl-1-oxa-2-silacyclopentane, 2,2,-diphenyl-1-oxa-2-silacyclopentane, 2,2,-dimethyl-3-phenyl-1-oxa-2-silacyclopentane, and 2,2,-dimethyl-1-oxa-2-silacyclohexane.

3. A method according to claim 2 in which the oxa-silacycloalkane is the compound.

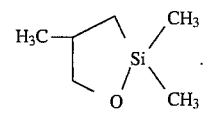

4. A method according to claim 1 in which the filler is selected from the group consisting of titanium dioxide, iron oxide, titanium coated mica, silica, magnesium oxide, calcium oxide, aluminum oxide, titanium oxide, zirconium oxide, chromium oxide, manganese oxide, cobalt oxide, nickel oxide, magnesium hydroxide, calcium hydroxide, aluminum hydroxide, chromium hydroxide, iron hydroxide, kaolin, montmorillonite, clay mica, chlorite, serpentine, zeolites, pyrophyllite, talc, chrysotile, antigorite, lizardite, kaolinite, nacrite, halloysite, nontronite, saponite, sauconite, bentonite, natrolite, heulandite, stilbite, mesolite, scolecite, thomsonite, analcite, phillipsite, chabazite, muscovite, biotite, sericite, lepidolite, wollastonite, nepheline-syenite, dickite, epistilbite, harmotome, gmelinite, lepidomelane, zinnwaldite, paragonite, silica-alumina, and mica-iron oxide.

5. A method according to claim 1 in which the filler is selected from the group consisting of sand, ground glass, plate glass, glass beads, fumed silica, ground silica, precipitated silica, colloidal silica, diatomaceous silica, solid silica, hollow silica, crystalline silica, amorphous silica, anhydrous silica, hydrated silica, silica aerogel, silica xerogel, fused silica, and pyrogenic silica.

6. A filler prepared according to the method defined in claim 1.

7. A filler prepared according to the method defined in claim 5 in which the oxa-silacycloalkane is a compound selected from the group consisting of:

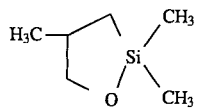

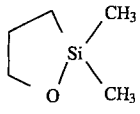

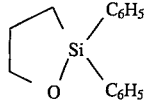

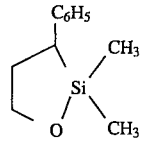

-continued

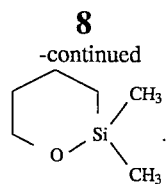

8. A method according to claim 1 in which the hydrophobed filler is contacted with a perfluorocarboxylic acid to add a perfluoro group to the filler surface.

9. A method according to claim 8 in which the perfluorocarboxylic acid is a compound having the formula $F-(CF_2)_n-COOH$ where n is 1–13.

10. A method according to claim 9 in which the perfluorocarboxylic acid is a compound selected from the group consisting of perfluoroacetic acid $CF_3-COOH$, perfluoropropionic acid $CF_3-(CF_2)-COOH$, perfluorobutyric acid $CF_3-(CF_2)_2-COOH$, perfluorohexanoic acid $CF_3-(CF_2)_4-COOH$, perfluoroheptanoic acid $CF_3-(CF_2)_5-COOH$, perfluorooctanoic acid $CF_3-(CF_2)_6-COOH$, perfluorononanoic acid $CF_3-(CF_2)_7-COOH$, perfluorodecanoic acid $CF_3-(CF_2)_8-COOH$, and perfluoroundecanoic acid $CF_3-(CF_2)_9-COOH$.

11. A filler prepared according to the method defined in claim 8.

12. A filler having a surface containing carbinol functionality, where the carbinol functionality is present as a substituent on the surface of the filler as represented by

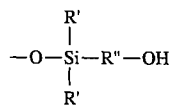

where R' is an alkyl group of 1–6 carbon atoms, an aryl group, an aralkyl group, an alkaryl group, or a halohydrocarbon radical; and R" is.

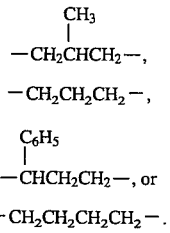

* * * * *